United States Patent [19]

Alexander

[11] Patent Number: 4,633,636

[45] Date of Patent: Jan. 6, 1987

[54] RETAINER ASSEMBLY

[76] Inventor: William E. Alexander, P.O. Box 791, Ponca City, Okla. 74602

[21] Appl. No.: 693,841

[22] Filed: Jan. 22, 1985

[51] Int. Cl.[4] .......................... E04B 1/40; E04B 1/62; F16B 21/16

[52] U.S. Cl. ........................................ 52/512; 52/506; 411/522; 411/529; 24/702; 110/336

[58] Field of Search ................. 52/509, 512, 506, 508; 266/283, 285, 280; 110/336, 331; 24/702, 669; 411/516, 520, 522, 523, 524, 529

[56] References Cited

U.S. PATENT DOCUMENTS

| | | | |
|---|---|---|---|
| 2,357,525 | 9/1944 | Knight | 52/509 |
| 2,367,109 | 1/1945 | Fay, Jr. | 411/520 |
| 2,591,723 | 4/1952 | Sampson | 110/336 |
| 3,264,792 | 8/1966 | Drazdik et al. | 52/512 |
| 3,336,712 | 8/1967 | Bartley | 52/454 |
| 3,523,395 | 8/1970 | Rutter et al. | 52/508 |
| 3,738,217 | 6/1973 | Walker | 52/506 |
| 3,742,670 | 7/1973 | Byrd, Jr. | 110/336 |
| 4,018,023 | 4/1977 | Anderson | 52/508 |
| 4,030,261 | 6/1977 | Coleman | 52/506 |
| 4,139,975 | 2/1979 | Baker | 52/506 |
| 4,157,001 | 6/1979 | Pickles | 52/506 |
| 4,244,269 | 1/1981 | Gorell | 52/506 |
| 4,370,840 | 2/1983 | Bisbee et al. | 52/506 |

FOREIGN PATENT DOCUMENTS

| | | | |
|---|---|---|---|
| 24818 | 3/1981 | European Pat. Off. | 110/336 |
| 3228319 | 2/1984 | Fed. Rep. of Germany | 110/336 |
| 1504805 | 10/1967 | France | 411/523 |
| 1548569 | 7/1979 | United Kingdom | 52/509 |

*Primary Examiner*—Carl D. Friedman
*Assistant Examiner*—Michael Safavi

[57] ABSTRACT

A retainer assembly is disclosed for retaining insulation material or the like adjacent a surface, such as an interior furnace wall. The retainer assembly comprises a longitudinally-extending member or stud and a retainer member or washer mounted thereon. The stud includes at least one throat portion. The washer comprises a body from which two prongs extend to define a channel. The prongs are folded back so that as a throat portion of the stud passes therethrough, the folded-back portions are compressed. Upon passage of the throat portions through this zone of the channel, the compressed folded-back portions of the prongs are released from compression thereby retaining the stud within a second zone of the channel.

9 Claims, 6 Drawing Figures

RETAINER ASSEMBLY

BACKGROUND OF THE INVENTION

1. Field of the Invention

The present invention relates to a retainer assembly for maintaining insulation matrial, ceramic fiber, refractory material, or the like adjacent a surface and, more particularly, to such a retainer assembly which includes a longitudinally extending member or stud and a retainer member or washer transversely mounted thereon.

2. Setting of the Invention

Various commercial operations, such as cement manufacturing, oil and petrochemical refining, sugar manufacturing, steel manufacturing, casting operations, and the like, include the use of heaters or furnaces with high-temperature areas. These high-temperature areas can be protected by an interior wall or liner of refractory material, ceramic fiber, fire bricks, as well as a liner of insulation material. Such insulation material can be in the form of bats, blankets, panels, blocks, and the like; all of which can be mounted on or retained adjacent to the interior surface of the refractory bricks.

Of particular interest to the present discussion are the types of insulation materials that are retained by longitudinally-extending studs, which penetrate through the insulation material, and retaining washers mounted to the studs to retain the insulation material.

Several different types of longitudinally-extending studs and washers, collectively referred to as retainer assemblies, have been commercially marketed. Representative of these are those illustrated in U.S. Pat. Nos. 3,336,712; 3,523,395; 3,738,217; 4,018,023; and 4,139,975. These retainer assemblies are all put into operation by longitudinally pushing a washer onto the stud to retain the insulation material. These usually require the resiliency of the material to effect a locking or securing action. The inventor hereof knows of no retainer washer which is mounted to or removed from a stud by transversely sliding the washer onto the stud. Also, these retainer assemblies can require several stamping or machining operations which can greatly increase the cost of manufacturing the retainer assemblies, as well as decrease the number of retainer assemblies which can be produced within a given time period.

The only known retainer assembly which can be considered relatively inexpensive to manufacture includes a washer which is longitudinally pushed onto the stud to slightly compress the insulation material and then is rotated ninety degrees (90°). The resiliency or "springiness" of the insulation material pushes or acts on the washer to keep it in place on the stud. The problem encountered with this type of retainer assembly is that, after assembly, the furnaces which include these retainer assemblies can be moved great distances via different types of transportation mediums to the final installation site. During such trips, the furnaces can be vibrated so greatly that the washers tend to rotate back 90° and are then pushed off of or simply fall off of the stud. When this occurs, the furnace must be reopened and the washers remounted, which is a costly and time-consuming procedure.

There is a need for a retainer assembly which is comparatively inexpensive to manufacture. Also, there is a need for a retainer assembly which includes a washer that is positively retained on the stud so that it cannot vibrate loose and is not dependent upon the resiliency of the insulation material to maintain the washer on the stud. Further, there is a need for a washer which can be transversely mounted on the stud rather than be longitudinally pushed onto the stud.

SUMMARY OF THE INVENTION

The present invention is contemplated to meet the foregoing needs. The present invention comprises a retainer assembly for retaining insulation material or the like adjacent a surface. The retainer assembly comprises a longitudinally-extending member having at least one throat portion, and a retainer member mounted thereon. The retainer member comprises a body having at least two prongs exteriorly extending therefrom in the same plane to define a channel therebetween. The prongs are folded back to define a first zone of the channel adjacent the folded-back portions of the prongs and a second zone not adjacent the folded-back portions of the prongs. The first zone sized to permits a throat portion of the longitudinally-extending member to pass therethrough. Upon passage of the throat portion through the first zone, the folded-back portions of the prongs are compressed and released from compression and thereby positively retain the longitudinally-extending member within the second zone of the channel. Thus, the retaining member can retain the insulation material or the like adjacent the surface.

DETAILED DESCRIPTION OF THE PREFERRED EMBODIMENTS

The present invention relates to a retainer assembly for retaining insulation material or the like adjacent a surface. The retainer assembly comprises a longitudinally-extending member having at least one throat portion, and a retainer member mounted thereon. The retainer member comprises a body having at least two prongs exteriorly extending therefrom in the same plane to define a channel therebetween. The prongs are folded back to define a first zone of the channel adjacent the folded-back portions of the prongs, and a second zone not adjacent the folded-back portions of the prongs. The first zone sized to permits a throat portion of the longitudinally-extending member to pass therethrough. Upon passage of the throat portion through the first zone, the folded-back portions of the prongs are compressed and released from compression and thereby positively retain the longitudinally-extending member within the second zone of the channel.

The retainer assembly of the present invention can be used within high-temperature kilns, boilers, stacks, furnaces or heaters, which can include refractory material and insulation material therein. Such furnaces or heaters are be used in cement plants, sugar mills, steel mills, casting plants, oil and petrochemical refineries, and the like. The refractory material can be in the form of bricks or the like and the insulation material can be in the form of bats, blankets, or pads as is well known in the art. For the purposes of the present discussion, it will be assumed that the retainer assembly of the present invention is utilized to retain a blanket of mineral-type insulation material, called ceramic fiber, adjacent or against a refractory brick surface, which is in turn mounted within the interior of a furnace or heater.

Figure 1:
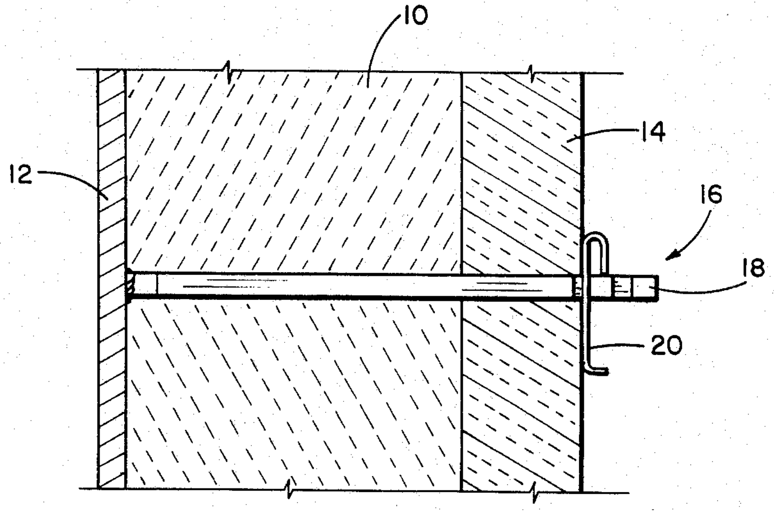
FIG. 1 is a cross-sectional, elevational view of a retainer assembly of the present invention mounted within a high-temerature vessel.

As shown in FIG. 1, blocks of refractory material 10 are retained against the interior wall of the steel shell of a heater or furnace 12. A blanket of insulation material 14 is maintained against the surface of the refractory material 10 by means of a retainer assembly 16 of the prevent invention and which will be described in more detail below.

The retainer assembly 16 is mounted to the furnace wall 12, as will be described below, and can pass through openings or joints in the refractory material 10, as is well known in the art. The retainer assembly 16 comprises a longitudinally-extending member 18 or stud and a retainer member 20 or washer, which is mounted to the stud 18, as will be described below.

The retainer assembly 16 can be formed from any suitable material. Such materials can include plastics, metals, and certain types of ceramics. Of the metals, carbon steel, stainless steel, and high chromium-nickel steel can be used. For the purposes of the present discussion, it will be assumed that the retainer assembly 16 is formed from a metal material, such as stainless steel.

The washer 20 and the stud 18 can be formed from the same material or from different materials as is desired. Also, the stud 18 can be formed from 16-gauge to about 3/16 in. material, and the washer 20 can be formed from about 11- to about 20-gauge material. For ease of manufacture and cost, both the washer 20 and the stud 18 are preferably formed from about 16- to about 18-gauge material of the same kind.

The stud 18 can be in the form of an elongated member having a cross-section of triangular, round, square, rectangular, oval, or half-circle configuration. For ease of manufacture, it is preferred that the cross-section configuration of the stud 18 be rectangular or half-circular. A first end 22 of the stud 18 is adapted for connection or fixation to the shell of the furnace 12 or the refractory material, as is well known in the art. The first end 22 can be flat or triangular in shape to facilitate connection. Also, a ball of welding flux 23 can be provided on the first end 22. Specifically, the first end 22 can be welded to the furnance 12. Also, the first end 22 of the stud 18 can be mounted to the refractory material 10 as discussed and shown in U.S. Pat. No. 4,139,975, which is herein incorporated by reference.

Figure 2:
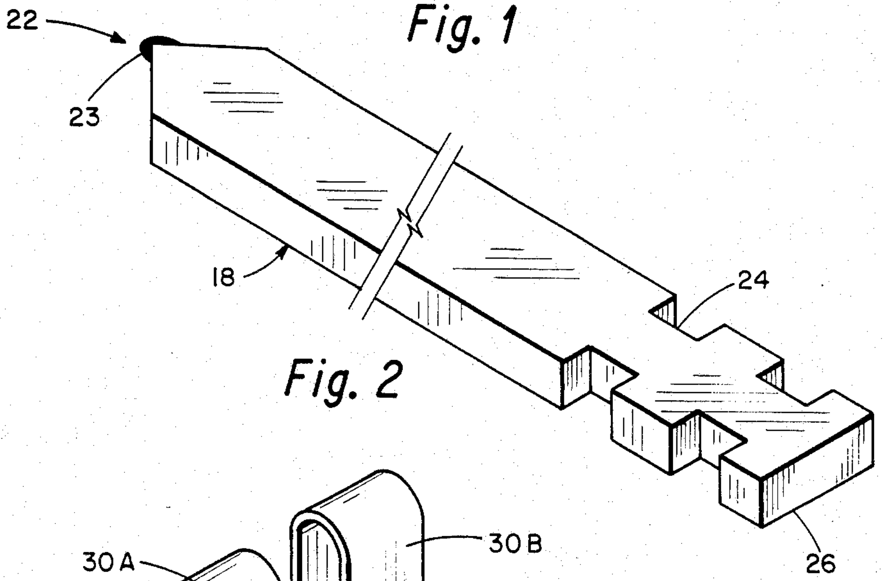
FIG. 2 is a perspective elevational view of one embodiment of a longitudinally-extending member of the present invention.

The stud 18 is provided with at least one narrowed or throat portion 24. A plurality of throat portions 24 can be provided on the stud 18, and the complete length of the stud 18 can be provided with such throat portions 24 if desired. The throat portions 24 can be in the form of notches or annular grooves, and can be parallel inclined or in the form of barbs. For ease of manufacture, it is preferred that the throat portions 24 be in the form of rectangular or square opposed notches, as shown in FIG. 2. Also, the plurality of throat portions 24 can be biased toward a second end 26 of the stud 18.

Figure 3:
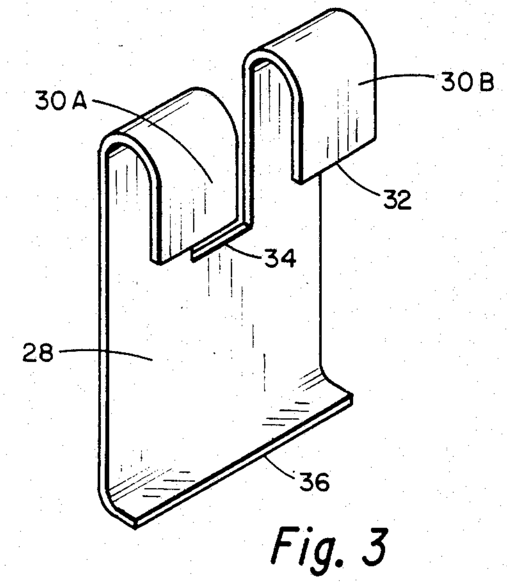
FIG. 3 is a perspective elevational view of one embodiment of a retainer member of the present invention.

The washer 20 is in the form of a body 28, which can be planar or sloped, and triangular, round, square, rectangular, or oval in shape as desired. Extending from the body 28 are at least two prongs 30A and 30B. The prongs 30A and 30B can lie in the same plane as the body 28, in a different plane, or in different planes as desired. The prongs 30A and 30B are folded back upon themselves, as shown in FIG. 3, to define a channel 32 therebetween. The prongs 30A and 30B are preferably folded back in the same or similar manner; i.e., over on top of each or down under. However, one prong can be folded on top while the second prong can be folded down under, as is desired.

The channel 32 can be in any desired configuration, for example approximately triangular, square, or rectangular. Preferably, the channel 32 is rectangular in configuration and provided with an end portion 34 of the channel 32 at 90° to the sides or walls of the channel 32. The folded-back portions of the prings 30A and 30B define a first zone of the channel 32, which is immediately adjacent or between the folded-back portions, and a second zone of the channel 32, which is not adjacent or between the folded-back portions of the prongs 30A and 30B.

For ease of mounting the washer 20 on the stud 18, one or more raised lips 36 can extend from the body 28 as desired.

Figure 4:
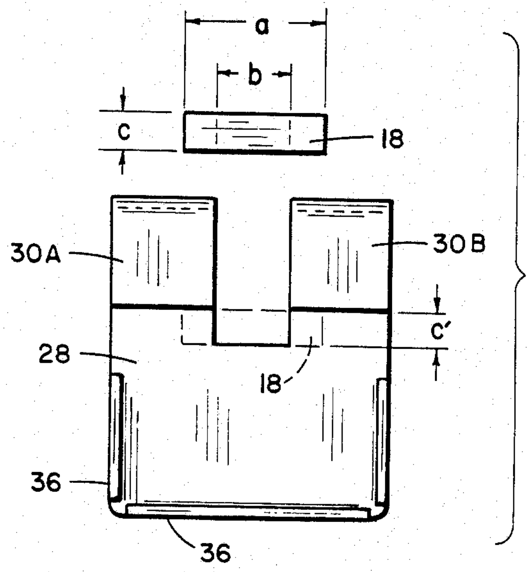
FIG. 4 is a plan view of a retainer member and a longitudinally-extending member prior to engagement.
Figure 5:
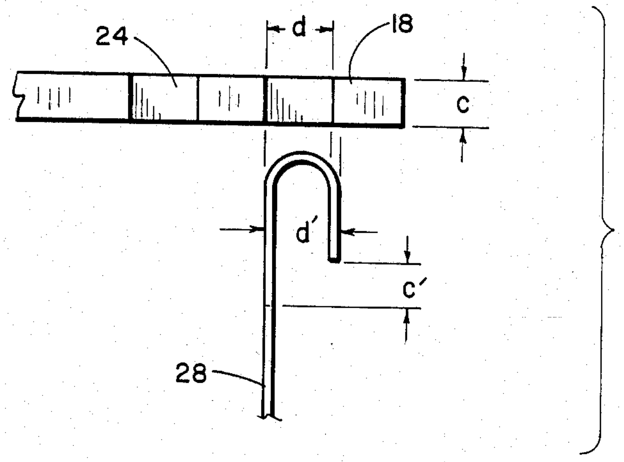
FIG. 5 is a side elevational view of a retainer member and a longitudinally-extending member prior to engagement.

To better understand the operation of the present invention, as well as its true novelty, reference is made to FIGS. 4 and 5. There are several interrelated dimensions between the stud 18 and the washer 20 which enable the benefits of the present invention to be realized. Specifically, the horizontal extent or cross length of the stud 18 is represented by a distance "a". The horizontal extent or cross length of the throat portions 24 is represented by a distance "b". Further, the depth or width of the stud 18 is represented by a distance "c".

The width of the channel 32 at its widest point within the second zone should be no more than the cross length of the stud 18; i.e., "a". Also, the length of the channel 32 beyond the folded-back portions of the prongs 30A and 30B, or in other words, the length of the second zone, is represented by a distance "c'", which should not be less than the width of the stud 18; i.e., "c". The distance "c'" should not be so long as to allow for the rotation of the stud 18 about its longitudinal axis which would allow for the release of the stud 18 from the second zone of the channel 32.

Referring now to FIG. 5, the height of each throat portion 24 is represented by a distance "d" and should be less than the height of the folded-back portions of the prongs 30A and 30B at rest, represented by a distance "d'". The length of the first zone versus the second zone, as well as the distance between each of the throat portions 24, has not been found to be critical and can be varied as desired.

Now that the retainer assembly 16 has been described in its component parts, the operation and utilization of the retainer assembly 16 will be herein described. After a furnace 12 has been prepared and the refractory material 10 has been installed (if desired), a plurality of studs 18 are then affixed to the interior surface of the furnace 12 or to the blocks of refractory material 10, as has been described above. Generally, the first end 22 of the stud 18 is welded to the interior surface of the furnace 12. Thereafter, the insulation material 14 is pressed onto, against or adjacent the refractory material 10. The second ends 26 of the studs 18 are pushed out through the insulation material 14, and then the insulation material 14 is slightly compressed, if desired, and the washers 20 are traversely slid onto the studs 18.

As the washer 20 is transversely slid into engagement with the stud 18, the folded-back portions of the prongs 30A and 30B are brought into engagement with a throat portion 24 of the stud 18. The throat portion 24, having a height "d", will slightly compress the folded-back portions of the prongs 30A and 30B, having a greater height "d'". Once the folded-back portions of the prongs 30A and 30B have passed across or through the throat portion 24, then the throat portion 24 will be passed into the second zone of the channel 32. Since the length of the second zone, "c'", is slightly greater than the width of the stud 18, "c", the folded-back portions of the prongs 30A and 30B will be released from compression. Since "d'" is again greater than "d", the stud 18 cannot be moved back out from the channel 32 and is thereby retained positively within the second zone of the channel 32.

Figure 6:
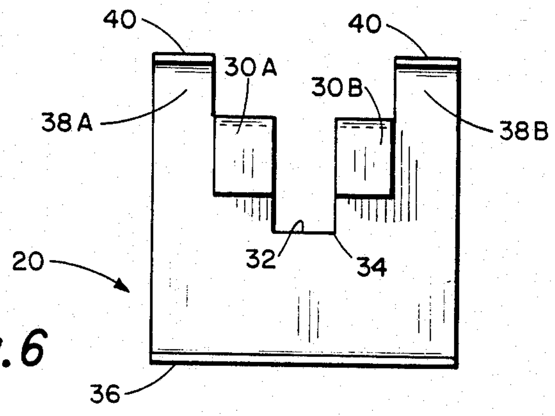
FIG. 6 is a plan view of an alternate embodiment of a retainer member.

The present invention can easily be made in different embodiments and, as shown in FIG. 6, the washer 20 can include additional prongs or extensions 38A/38B lying in parallel with the prongs 30A/30B. Also, as shown in the washer embodiment of FIG. 6, the extensions 38A/38B can be provided with raised lips 40, if desired.

In the event that a repair or removal is needed to be made to the insulation material in the interior of the furnace 12, then a simple elongated tool, or even a pipe, can be pushed coaxially onto the stud 18 to compress the prongs 30A and 30B such that "d'" is made to be less than "d". Then the washer 20 can be pulled transversely off of the stud 18.

While the present invention has been described primarily for use in furnaces or heaters, the present invention obviously can be utilized in any other operation where there is a need to retain material adjacent or against a surface, such as to retain fiberglass insulation against a wall or a ceiling, or in the mounting of acoustic ceiling panels.

Whereas the present invention has been described in particular relation to the drawings attached hereto, it should be understood that other and further modifications, apart from those shown or suggested herein, may be made within the scope and spirit of the present invention.

What is claimed is:

1. A retainer assembly for retaining insulation material or the like adjacent a surface, the retainer assembly comprises a longitudinally-extending member having at least one throat portion thereon, and a retainer member for mounting thereon; the retainer member further comprises a body having at least two prongs exteriorly-extending therefrom and which lie in the same plane to define a channel there between, an outer portion of the prongs being folded back, the channel having a first zone adjacent to the folded-back portions of the prongs and a second zone not adjacent to the folded-back portions of the prongs;

the first zone having a width less than a cross-length of the throat portion of the longitudinally-extending member, and the folded-back portions of the prongs having a height greater than a height of the throat portion of the longitudinally-extending member; and upon passage of the throat portion through the first zone of the channel, the folded-back portions of the prongs are compressed and released from compression to thereby retain the longitudinally-extending member within the second zone of the channel.

2. The retainer assembly of claim 1 wherein the longitudinally-extending member includes a plurality of spaced-apart throat portions.

3. The retainer assembly of claim 2 wherein a first end of the longitudinally-extending member is adapted for fixation to the surface.

4. The retainer assembly of claim 1 wherein the throat portions are formed by opposed, rectangular notches.

5. The retainer assembly of claim 1 wherein the body of the retainer member is planar.

6. The retainer assembly of claim 1 wherein the at least two prongs are folded-back in like manner.

7. The retainer assembly of claim 1 wherein the body includes at least one raised lip portion.

8. The retainer assembly of claim 1 wherein the channel is rectangular in configuration.

9. In combination with a high-temperature vessel, including refractory material and a liner of insulation material adjacent thereto, a retainer assembly for retaining the liner adjacent to the refractory material, the retainer assembly comprises a longitudinally-extending member having at least one throat portion thereon, and a retainer member for mounting thereon; the retainer member further comprises a body having at least two prongs exteriorly-extending therefrom and which lie in the same plane to define a channel there between, an outer portion of the prongs being folded back, the channel having a first zone adjacent to the folded-back portions of the prongs and a second zone not adjacent to the folded-back portions of the prongs;

the first zone having a width less than a cross-length of the throat portion of the longitudinally-extending member, and the folded-back portions of the prongs having a height greater than a height of the throat portion of the longitudinally-extending member; and upon passage of the throat portion through the first zone of the channel, the folded-back portions of the prongs are compressed and released from compression to thereby retain the longitudinally-extending member within the second zone of the channel.

* * * * *